Aug. 16, 1932.  E. S. PATCH  1,871,912
OPERATING PISTON FOR LIQUID METERS
Filed Dec. 21, 1927

Inventor
Earl S. Patch
By Spencer, Hardman and Fehr
His Attorney

Patented Aug. 16, 1932

1,871,912

UNITED STATES PATENT OFFICE

EARL S. PATCH, OF DAYTON, OHIO, ASSIGNOR TO THE MORAINE PRODUCTS COMPANY, OF DAYTON, OHIO, A CORPORATION OF OHIO

OPERATING PISTON FOR LIQUID METERS

Application filed December 21, 1927. Serial No. 241,695.

This invention relates to liquid metering devices of the type employing a nutating disk or piston to actuate the registering apparatus, and more specifically to improvements in the construction of the said piston and bearing surfaces therefor.

In meters of this type such as heretofore constructed, the disk piston including the ball which provides a bearing surface for such piston, has generally been made of hard rubber, because the specific gravity of hard rubber is not greatly different from that of water and its coefficient of friction comparatively low. For these reasons the friction between the piston and the surfaces with which it contacts is relatively small. Other materials such as glass and graphite have also been employed in the manufacture of liquid meter pistons for the purpose of reducing frictional resistance to motion of said piston.

It is the primary object of this invention to provide a liquid meter having a piston of novel construction and to provide bearing surfaces for said piston which are formed of material which will reduce the friction at such bearing surfaces to the lowest possible minimum.

It is a further object of the invention to provide a liquid meter having a piston formed of material which will not warp on change of temperature or other varying operating conditions and which will resist corrosion.

It is a further object of this invention to provide a liquid meter having a piston provided with bearing surfaces which automatically lubricates said surfaces by supplying a film of oil thereto and to the parts of the meter contacting with said bearing surfaces.

With these objects in view the invention contemplates the provision of a liquid meter having a piston and bearing surfaces therefor which are entirely or in part formed of a porous metallic structure in which a lubricant may be absorbed.

A further feature of the invention consists in the provision of a liquid meter having a piston which is provided with a bearing surface formed of a hollow, porous metallic structure, the interior of which is adapted to be filled with lubricant which may be absorbed by said metallic structure to form a film of lubricant on the surface thereof.

A still further feature of the invention resides in the provision of a liquid meter having a piston of the type described, comprising a disk of hard rubber provided with bearing surfaces formed of a porous metallic structure impregnated with a lubricant, said metallic structure having recesses formed on the inner surface thereof and adapted to be secured to the rubber while the latter is in a fluent condition, so that rubber will enter said recesses and harden, securely attaching the metallic bearing surfaces to said disk.

Further objects and advantages of the present invention will be apparent from the following description, reference being had to the accompanying drawing, wherein a preferred embodiment of one form of the present invention is clearly shown.

Figure 1:
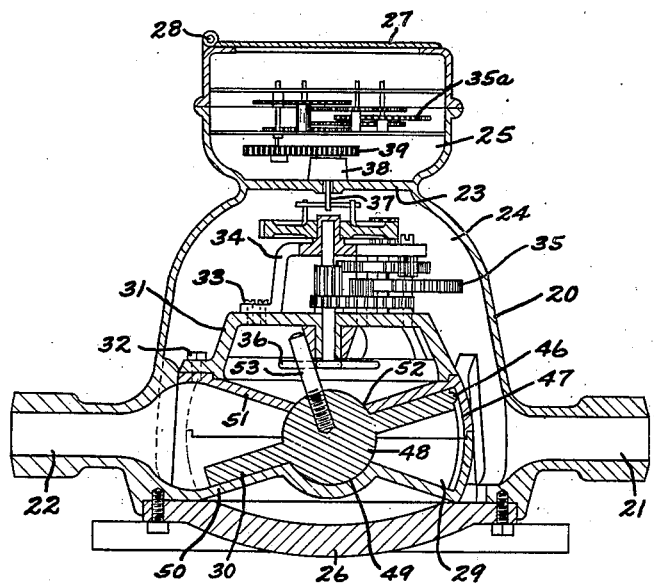
Fig. 1 is a vertical section through a liquid meter disclosing one form of the improved operating piston.

Referring to Fig. 1, the reference numeral 20 indicates the main outer casing of a liquid meter having a liquid inlet 21 and an outlet 22. A partition 23 forms two chambers 24 and 25 within the casing 20. In the main or lower chamber 24 the driving mechanism is positioned while the smaller upper chamber 25 houses the registering mechanism operated by the driving mechanism.

A bottom plate 26 is secured by screws to the main casing and a top 27 is hinged at 28 to permit opening for access to the registering mechanism.

A measuring or piston chamber 29 is provided within the main chamber and positioned therein is an operating piston hereinafter more fully described. A supporting plate 31 is secured by screws 32 to the piston chamber and fixed thereon by screws 33 is another supporting plate 34. These two plates support a train of operating gearing indicated in its entirety by the numeral 35. This gearing need not be described in detail as it is old and well known mechanism. This train of gearing is driven by a star wheel 36 operated by the piston 30 as hereinafter set forth, and such gearing operates a spindle 37 journalled in the partition 23 and a stuffing box 38, and provided with a gear 39 on its upper end which operates the register gearing indicated in general by the numeral 35a. The register and its driving means is also old, the specific details of construction thereof forming no part of this invention, and is described in general terms above merely to facilitate understanding of the improvement in which the present invention resides.

The outer casing is provided with ribs 40 engaging corresponding ribs 41 to form vertical passages through which the liquid will flow from the inlet 21 and will take its passage up over the measuring chamber and down into the inlet opening 42 to said chamber. Thence the liquid will pass through this chamber, and after operating the piston 30 in the manner well known in the art will pass out of the measuring chamber through outlet 43 into the outlet 22 from the main casing. A slot 44 in the disk piston engages a radial partition 45 which separates the inlet 42 from outlet 43 and prevents any rotary motion of the piston as a whole. The piston is provided, on the circumferential edge of the disk opposite the slot 44, with a projecting lug 46 engaging in a groove 47 formed on the inside wall of the measuring chamber, to guide the piston in its movements.

The piston 30 is provided at its center with a ball 48 which seats in a correspondingly shaped recess 49 formed in the lower wall 50 of the measuring chamber while that part of the ball above the disk projects through a hole in the upper wall 51 of the measuring chamber, and the edge 52 of the wall adjacent the ball provides a seat therefor. Screwed into the ball 48 and projecting therefrom in a direction perpendicular to the plane of the disk is an operating pin 53 which engages the star wheel 36 to drive the registering mechanism through the associated trains of gearing 35 and 35a.

As is well understood in this art the piston wobbles during passage of liquid through the meter in such a way that the pin 53 travels in a path which is substantially the surface of a cone the apex of which is the center of ball 48, any specific point in the length of the pin moving in a circular path, so that the star wheel is rotated during the passage of liquid through the meter, the rate of rotation depending on the quantity of liquid flowing therethrough.

As previously stated, this piston and ball have been made of various materials heretofore, such as hard rubber, with or without metal reinforcement, metal, glass or compounds containing graphite. These materials have not given satisfactory results, being subjected to warping or corrosion, or providing ineffective lubrication of the bearing surfaces of the operating piston. The present invention contemplates the provision of an operating piston made of a porous metallic structure having lubricating oil absorbed therein.

The method of forming the porous metallic structure constitutes no part of this invention, but may be briefly described as follows: A mixture of metal powders such as copper and tin with graphite and a volatile void forming substance such as salicylic acid, is placed in a die and briquetted into the desired form at a pressure of 60,000 to 75,000 pounds per square inch. This form is then sintered by heating in a non-oxidizing atmosphere at a temperature and for a time sufficient to cause alloyage of the metals and to volatiltize the salicylic acid which will form a structure interspersed with a large number of minute inter-communicating voids. The element may then be immersed in a bath of hot lubricating oil which will be absorbed thereby. For a detailed description of the method of manufacture of porous metallic bodies of this character reference is made to the patent to H. M. Williams No. 1,642,347.

The disk 30 and bearing ball 48 are formed as one solid piece in the manner above described, a hole is then drilled in the ball, threaded and the steel operating pin 53 screwed therein, the piston being then assembled in the meter with the pin 53 engaging the star wheel 36.

The advantages possessed by a meter having an operating piston formed as above described are many. The lubricating oil which is absorbed in the piston forms a coating or film of oil over the entire surface of the disk, ball and guiding lug 46. This film of oil is automatically renewed by capillary action as the oil is used up during operation, until all the oil absorbed in the piston is exhausted. The oil will last for a long time, will provide thorough lubrication of all bearing or contacting surfaces of the piston. When the oil in the piston is exhausted it may be removed and again immersed in a bath of lubricating oil and reassembled.

Further, a meter provided with a piston of the character described is not open to difficulties caused by warping of the piston due to changes of temperature of the liquid passing through the meter, as has sometimes been the case in meters heretofore known. A piston constructed as described will never be affected by changes of temperature in the liquid coming in contact therewith.

In addition the film of oil which is formed at all times on the surface of the piston will prevent corrosion and consequent wear, not only of the bearing or contacting surfaces of the piston, but of the surfaces of the measuring chamber engaging therewith. The oil not only coats the surface of the piston, but also coats the surfaces with which it engages with an oil film which prevents corrosion of these surfaces as well. The reduction in wear brought about by prevention of corrosion of the contacting surfaces of the piston and its chamber is obvious.

Figures 3, 4:
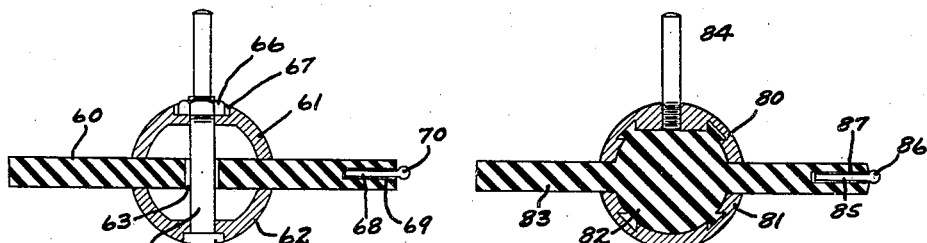
Figs. 3 and 4 are detail sections through two modified forms of operating pistons for meters of the type shown in Fig. 1.
Figure 2:
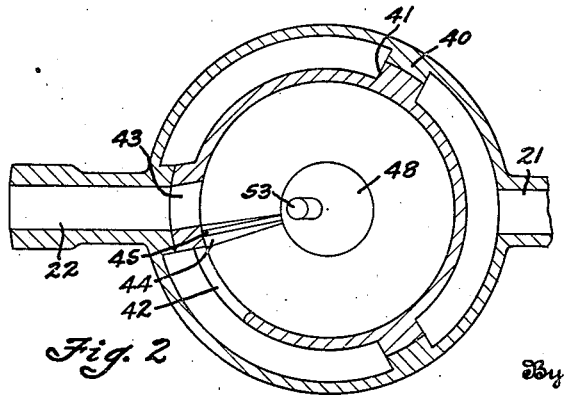
Fig. 2 is a horizontal center line section through the main casing but shows the piston in position therein.

In Fig. 3 is disclosed a modified form of operating piston for use in a liquid meter such as described above. In the form disclosed, a hard rubber disk 60 is shown, said disk being provided with a bearing ball comprising upper and lower halves 61 and 62 of nearly hemispherical form and made of the porous metallic structure formed as above described. These halves are formed with concave inner surfaces as indicated in the drawing and are positioned on opposite sides of the disk 60 which is provided with a hole 63 at its center adapted to receive a bolt 64 having a head 65 which is received in a recess formed in the outer surface of the lower half of the bearing ball when the device is assembled. The bolt projects through the upper half of the ball and is provided with a nut 66 which is received in a recess 67 formed in the upper half 61 of the ball, the recess being somewhat larger than the nut to permit the use of a tool for adjustment purposes. The upper end of the bolt is reduced in size and is adapted to engage the star wheel 36 to operate the registering mechanism in the manner previously set forth.

A pin 68 is loosely received in a radial bore 69 terminating at the circumferential edge of the disk, and is provided with a spherical head 70 adapted to engage the groove 47 to guide the disk during operation of the meter. The pin 68 being loosely received in bore 69, the head 70 will rotate on engagement with the walls of groove 47 with consequent reduction of friction.

In the device above described there is a considerable space within the bearing ball on both sides of disk 60. This space is adapted to be filled with oil when the device is assembled to provide oil for absorption by the bearing elements 61 and 62 as the oil already absorbed therein is consumed during operation of the meter. The provision of this reservoir of oil in contact with the porous metallic bearing surface will greatly prolong the time during which the piston will be automatically lubricated without further attention.

It will also be understood that, while a rubber disk 60 is shown in the modified form of the device above described, the disk could just as well be made from other materials. In fact the disk could be made of the same porous metallic structure which forms the bearing ball, or any other suitable material.

In the form disclosed in Fig. 4, a bearing ball is provided consisting of two nearly hemispherical bodies 80 and 81, similar to the elements 61 and 62 of the form shown in Fig. 3 and formed of the same porous metallic material. These porous metallic bodies are concave on the interior thereof and are secured directly to the enlarged center 82 of a hard rubber disk 83. To secure the bearing surfaces 80 and 81 to the disk, said elements 80 and 81 are provided with dovetail grooves on their inner surfaces and are vulcanized to the rubber disk in a mold while the rubber is in a fluent condition. Rubber will flow into the dovetail grooves and when hard will hold the bearing surfaces 80 and 81 immovably fixed relative to the disk. A pin 84 similar to the pin 53 is screwed into the bearing element 80 and is adapted to operate the star wheel 36. A pin 85, having a spherical outer end 86 is received in a bore 87, and operates in the same manner as pin 68 shown in Fig. 3. The device disclosed in this form of the invention functions in the same way as those previously described.

Figure 5:
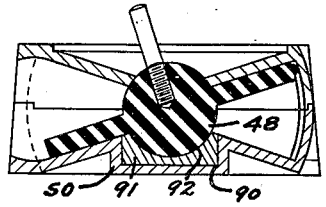
Fig. 5 is a fragmentary section disclosing a modified form of bearing surface for the operating piston.

In the modified form of the invention disclosed in Fig. 5 the seat for the ball 48 is formed of porous metallic material having a lubricant absorbed therein as above described. To this end the lower wall 50 of the measuring chamber is cast in the form shown in Fig. 5 with a cylindrical recess 90 therein. Secured in said recess by means of a metallic bond, welding or in any other suitable manner is a block 91 of porous metallic material, having a concave seat 92 of nearly hemispherical form, in its upper surface. This seat is adapted to receive the ball 48 of the operating piston, and when the porous metallic seat is employed the disk and ball may be formed of any of the materials mentioned herein, said disk and ball being shown in Fig. 5 as made of hard rubber.

The meter herein described is designed primarily to measure the flow of water, but obviously could be employed to determine the amount of flow of other liquids as well.

While the form of embodiment of the present invention as herein disclosed, constitutes a preferred form, it is to be understood that other forms might be adopted, all coming within the scope of the claims which follow.

What is claimed is as follows:

1. A nutating piston for liquid meters comprising, a disk and bearing surfaces therefor, said disk and bearing surfaces being integrally formed of a porous metallic structure and impregnated with a lubricant so as to retain its self lubricating qualities for long periods of use.

2. As an article of manufacture, a nutating piston for liquid meters comprising, a disk having a central ball shaped bearing surface and a guide lug projecting from its periphery, said disk, its bearing surface and projecting lug all being formed of porous bronze impregnated with a lubricant.

In testimony whereof I hereto affix my signature.

EARL S. PATCH.